(12) United States Patent
Yoon et al.

(10) Patent No.: US 11,399,694 B2
(45) Date of Patent: Aug. 2, 2022

(54) DISHWASHER WITH HEAT PUMP

(71) Applicant: LG Electronics Inc., Seoul (KR)

(72) Inventors: Sangheon Yoon, Seoul (KR);
Changyoon Jung, Seoul (KR)

(73) Assignee: LG Electronics Inc., Seoul (KR)

(*) Notice: Subject to any disclaimer, the term of this patent is extended or adjusted under 35 U.S.C. 154(b) by 103 days.

(21) Appl. No.: 16/698,192

(22) Filed: Nov. 27, 2019

(65) Prior Publication Data

US 2020/0163530 A1 May 28, 2020

(30) Foreign Application Priority Data

Nov. 28, 2018 (KR) .......................... 10-2018-0150013

(51) Int. Cl.
*A47L 15/42* (2006.01)
(52) U.S. Cl.
CPC ....... *A47L 15/4291* (2013.01); *A47L 15/4214* (2013.01); *A47L 15/4246* (2013.01); *A47L 15/4285* (2013.01); *A47L 2401/09* (2013.01); *A47L 2401/12* (2013.01); *A47L 2501/30* (2013.01); *Y02B 30/52* (2013.01); *Y02B 40/00* (2013.01)
(58) Field of Classification Search
CPC .............. A47L 15/4214; A47L 15/4246; A47L 15/4285; A47L 15/4291; A47L 2401/09; A47L 2401/12; A47L 2501/30; Y02B 30/52; Y02B 40/00
USPC ................... 134/56 D, 57 D, 58 D, 105, 107
See application file for complete search history.

(56) References Cited

U.S. PATENT DOCUMENTS

2015/0257627 A1* 9/2015 Park ...................... A47L 15/483
34/72

FOREIGN PATENT DOCUMENTS

| CH | 699692 | 3/2010 |
|----|--------|--------|
| DE | 102007019286 | 10/2007 |
| DE | 102017215584 | 3/2019 |
| KR | 100770071 | 10/2007 |
| KR | 101037921 | 5/2011 |

OTHER PUBLICATIONS

Office Action in German Appln. No. 102019131954.4, dated Jan. 26, 2022, 11 pages (with English translation).

* cited by examiner

Primary Examiner — Levon J Shahinian
(74) Attorney, Agent, or Firm — Fish & Richardson P.C.

(57) ABSTRACT

The present disclosure relates to a dishwasher having a heat pump, including a dishwasher body provided with a tub configured with a washing space therein and a sump provided at a bottom of the tub to temporarily accommodate washing water; a washing water storage unit provided in the dishwasher body to store washing water therein; a heat pump having a compressor, an evaporator, an expansion apparatus, and a condenser provided to exchange heat with the washing water of the washing water storage unit; and a controller that controls the heat pump to increase the temperature of the washing water of the washing water storage unit. As a result, a heating time of washing water may be shortened, thereby suppressing a time required for washing dishes from being prolonged.

18 Claims, 10 Drawing Sheets

DISHWASHER WITH HEAT PUMP

CROSS-REFERENCE TO RELATED APPLICATIONS

Pursuant to 35 U.S.C. § 119(a), this application claims the benefit of earlier filing date and right of priority to Korean Application No. 10-2018-0150013, filed on Nov. 28, 2018, the contents of which is incorporated by reference herein in its entirety.

TECHNICAL FIELD

The present disclosure relates to a dishwasher having a heat pump.

BACKGROUND

As is known, a dishwasher is a type of appliance that cleans dishes and/or cooking utensils using detergent and washing water. Such a dishwasher includes a dishwasher body typically configured with a washing space therein and a door that opens and closes the washing space.

The dishwasher body includes a rack for accommodating and supporting dishes, a spray arm for spraying washing water to the rack, a supply pump for supplying washing water to the spray arm, and a drain pump for draining the washing water of the sump to an outside of the dishwasher body.

The dishwasher includes various washing courses including some or all of pre-washing, washing, rinsing, heating rinsing and drying processes.

On the other hand, the dishwasher body is provided with a heating unit for heating the washing water. The heating unit, for example, is composed of an electric heater for generating heat when power is applied to heat washing water.

However, in a dishwasher in the related art, washing water is heated using an electric heater, and thus there is a problem that a relatively large amount of power is consumed when washing water is heated. Furthermore, washing water heated to wash dishes is discharged to an outside of the dishwasher in a state having a high temperature (energy), and thus there is a problem that energy loss occurs.

In consideration of this problem, some of the dishwashers are designed to have a waste heat recovery device for recovering the waste heat of the dishwasher using a heat pump to heat water supply, and some of the other dishwashers are designed to arrange a condenser of the heat pump on a bottom surface of a cleaning tank to heat washing water inside the cleaning tank.

However, in a waste heat recovery device of a dishwasher using such a heat pump, in order to recover heat from washing water discharged from a dishwasher, a plurality of heat exchange apparatuses and a long passage for the movement of washing water are configured separately from the dishwasher, and thus there is a problem that the number of parts for heating of washing water and waste heat recovery and the size thereof are increased and the configuration and control thereof are complicated.

In addition, washing water to be supplied is heated using the heat of the washing water discharged after a washing process or after a rinsing process, and thus there is a problem that the washing water to be supplied cannot be preheated before the washing process. Due to this, there is a problem that it takes a relatively long time to heat washing water.

Moreover, in a dishwasher arranged with a condenser under a cleaning tank to heat washing water inside the cleaning tank, the cleaning tank should be configured to be withdrawable from the dishwasher body to the outside, and thus a clearance for withdrawing the cleaning tank is generated between the condenser and the cleaning tank, and as a result, there is a problem that heat exchange between the condenser and the washing water of the cleaning tank is insufficient and the operating efficiency of the heat pump is deteriorated.

Besides, the cleaning tank is accommodated inside the dishwasher body, and a washing tank inside the cleaning tank is heated by the condenser after water is supplied to an inside of the cleaning tank, and thus there is a problem that a relatively long time is required to heat the washing water inside the cleaning tank.

PRIOR ART DOCUMENTS

Patent Documents (Patent Document 1) KR10-1037921 B1
(Patent Document 2) KR10-0770071 B1

SUMMARY

An aspect of the present disclosure is to provide a dishwasher having a heat pump capable of shorten the heating time of washing water to suppress washing time from being prolonged.

Furthermore, another aspect of the present disclosure is to provide a dishwasher having a heat pump capable of suppressing heat loss from being generated during the heating of washing water.

In addition, still another aspect of the present disclosure is to provide a dishwasher having a heat pump capable of eliminating the use of an additional heat exchange apparatus for heating washing water.

Moreover, yet another aspect of the present disclosure is to provide a dishwasher having a heat pump capable of eliminating the use of an additional heat exchange apparatus for recovering the waste heat of washing water.

In order to achieve the foregoing object, the present disclosure provides a dishwasher having a heat pump, including a dishwasher body provided with a tub configured with a washing space therein and a sump provided at a bottom of the tub to temporarily accommodate washing water; a washing water storage unit provided in the dishwasher body to store washing water therein; a heat pump having a compressor, an evaporator, an expansion apparatus, and a condenser provided to exchange heat with the washing water of the washing water storage unit; and a controller that controls the heat pump to increase the temperature of the washing water of the washing water storage unit.

According to an embodiment, the evaporator may be provided at an outside of the tub, and the controller may control the heat pump to be operated to increase the temperature of the washing water of the washing water storage unit prior to supplying washing water into the washing space.

According to an embodiment, the evaporator may be provided in the same space as the compressor inside the dishwasher body.

According to an embodiment, the dishwasher may further include a drain passage connected to the sump to drain washing water inside the sump to an outside of the dishwasher, wherein the evaporator is provided to exchange heat with the washing water of the sump or the washing water of the drain passage.

According to an embodiment, the controller may control the heat pump to exchange heat between the evaporator and washing water inside the sump prior to draining the washing water inside the sump.

According to an embodiment, the evaporator may be provided inside the sump.

Here, the evaporator may have a spiral shape, and disposed along a vertical direction inside the sump.

According to an embodiment, the washing water storage unit may be provided with a water pipe through which washing water flows into the washing water storage unit, and a water valve that opens and closes the water pipe, and the controller may control the water valve to store washing water into the washing water storage unit prior to draining the washing water inside the sump.

According to an embodiment, the dishwasher may further include a connection pipe that connects the washing water storage unit to the sump and an open-close valve that opens and closes the connection pipe, wherein the controller controls the open-close valve to supply the washing water of the washing water storage unit to the sump subsequent to heating the washing water of the washing water storage unit.

According to an embodiment, the evaporator may be provided to exchange heat with water inside the water tank at an inside of the water tank.

According to an embodiment, the water tank may be provided at an upper side of the compressor.

A heat transfer member that transfers the heat energy of the compressor to the water tank may be provided between the water tank and the compressor.

The heat transfer member may be provided with a heat exchange unit provided to exchange heat on a circumference of the compressor. As a result, heat exchange between the compressor and the heat transfer member may be promoted to transfer more heat energy of the compressor to the water tank through the heat transfer member.

The heat transfer member may be configured with a passage of washing water therein, and both end portions of the heat transfer member may be coupled to communicate with the water tank. As a result, water inside the water tank may be heated while being heat-exchanged with the compressor when moving along an inner passage of the heat transfer member.

The water tank may be provided with a water pipe that supplies water into the water tank.

The water pipe may be provided with a water pipe valve that opens and closes a passage of the water pipe.

A water level sensing unit that senses a water level may be provided inside the water tank.

The water pipe valve may be controlled to be opened and closed based on a sensing result of the water level sensing unit of the water tank.

According to an embodiment, the dishwasher may further include a cabinet provided at an outside of the tub, wherein the washing water storage unit is disposed between the cabinet and the tub, and the condenser is provided inside the washing water storage unit.

The condenser may include a plurality of straight sections arranged in parallel with one another and a plurality of curved sections that connect the straight sections to communicate with one another. As a result, water inside the water tank may be heated while being heat-exchanged with the compressor when moving along an inner passage of the heat transfer member.

A temperature sensing unit that senses the temperature of washing water may be provided inside the washing water storage unit.

The controller may control the operation of the compressor to be stopped when the temperature of washing water inside the washing water storage unit exceeds a preset temperature based on a temperature sensing result of the temperature sensing unit inside the washing water storage unit.

According to an embodiment, the dishwasher may further include a heating unit that heats washing water inside the tub and a temperature sensing unit that senses a temperature of washing water inside the tub, wherein the controller controls the heating unit to heat the washing water when the temperature of the washing water sensed by the temperature sensing unit is less than a preset temperature.

The dishwasher may further include a circulation pump that circulates the washing water of the sump.

The heating unit may include an electric heater that generates heat when power is applied.

The electric heater and the temperature sensing unit are provided inside the circulation pump.

As described above, according to an embodiment of the present disclosure, the heating time of washing water may be shortened by heating washing water supplied in advance during a washing process to prevent washing time from being prolonged due to the heating of the washing water.

Furthermore, washing water of the washing water storage unit and the condenser may be heated in direct contact with each other, thereby suppressing heat loss from being generated during the heating of the washing water.

In addition, the condenser may be provided inside the washing water storage unit, thereby eliminating the use of an additional heat exchange apparatus for heating washing water. Moreover, due to this, a space for the installation of the condenser may be saved.

Moreover, the condenser may be provided inside the washing water storage unit, thereby eliminating the use of an additional heat exchange apparatus for heating washing water. Due to this, a space for the installation of the condenser may be saved. Besides, the evaporator may be disposed in the same space as the compressor to facilitate the latent heat absorption of the evaporator, thereby efficiently performing the evaporation of refrigerant.

Furthermore, the evaporator may be disposed in the same space as the compressor to promote the cooling of the compressor, thereby reducing a load on the compressor.

In addition, washing water may be stored (supplied) in advance in the washing water storage unit prior to the waste heat recovery of the evaporator, thereby using heat energy recovered from the evaporator to heat the washing water of the washing water storage unit.

BRIEF DESCRIPTION OF THE DRAWING

The accompanying drawings, which are included to provide a further understanding of the disclosure and are incorporated in and constitute a part of this specification, illustrate one or more implementations of the disclosure and together with the description serve to explain the principles of the disclosure.

DETAILED DESCRIPTION

Figure 1:
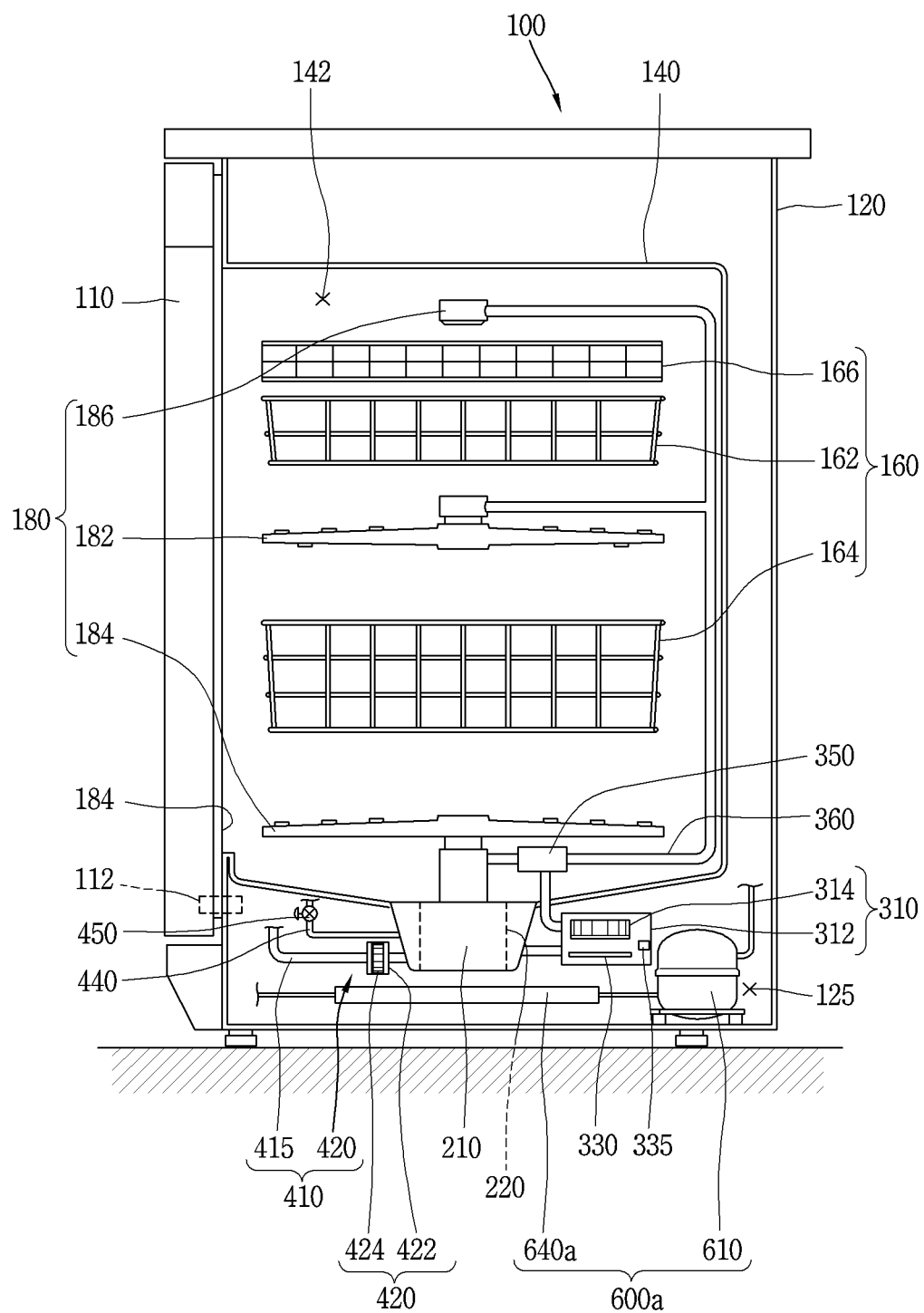
FIG. 1 is a cross-sectional view of a dishwasher having a heat pump according to an embodiment of the present disclosure.

Hereinafter, preferred embodiments disclosed in the present disclosure will be described in detail with reference to the accompanying drawings. Even in different embodiments according to the present disclosure, the same or similar reference numerals are designated to the same or similar configurations, and the description thereof will be substituted by the earlier description. A singular representation used in the present disclosure may include a plural representation as far as it represents a definitely different meaning from the context. In describing the embodiments disclosed herein, moreover, the detailed description will be omitted when specific description for publicly known technologies to which the disclosure pertains is judged to obscure the gist of the present disclosure. Also, it should be noted that the accompanying drawings are merely illustrated to easily explain the concept of the disclosure, and therefore, they should not be construed to limit the technological concept disclosed herein by the accompanying drawings.

Figure 2:
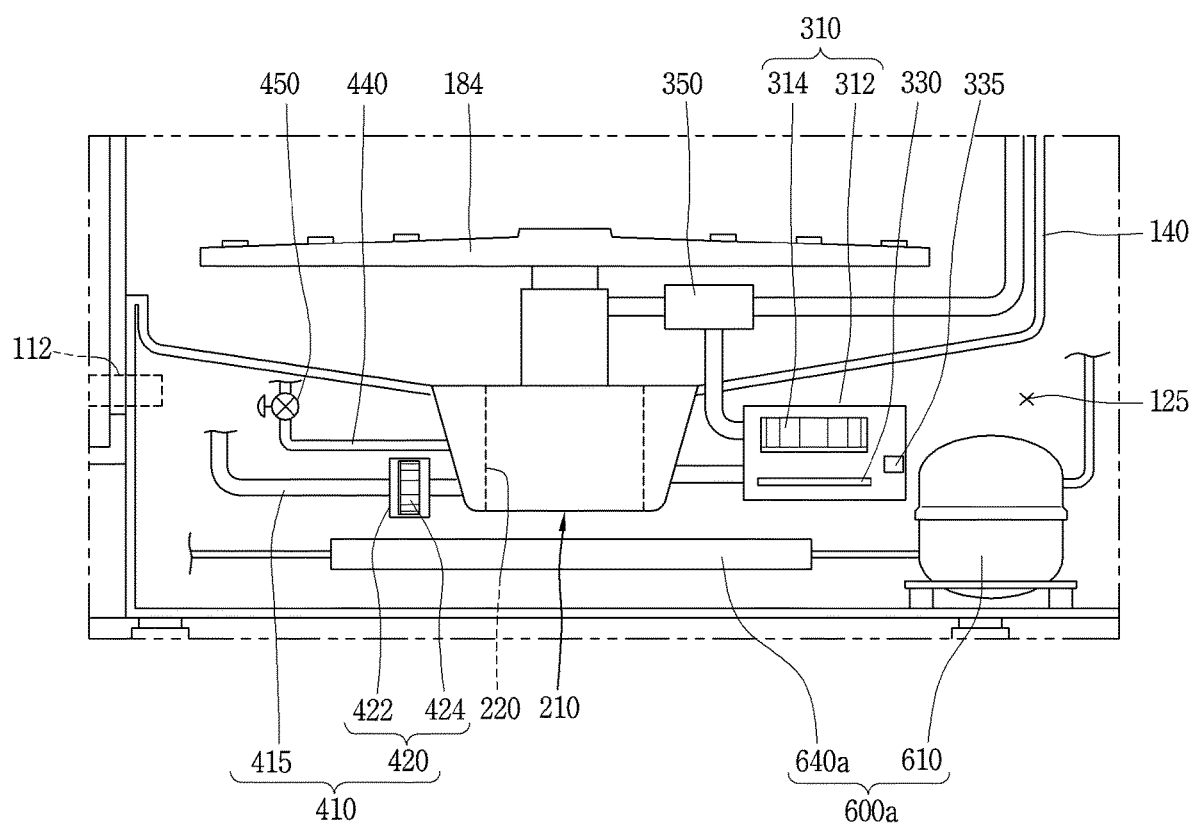
FIG. 2 is a partially enlarged view of FIG. 1.

FIG. 1 is a cross-sectional view of a dishwasher having a heat pump according to an embodiment of the present disclosure, and FIG. 2 is a partially enlarged view of FIG. 1. As illustrated in FIGS. 1 and 2, a dishwasher having a heat pump according to an embodiment of the present disclosure includes a dishwasher body 100 configured with a washing space 142 therein and a door 110 that opens and closes the washing space 142.

The dishwasher body 100 includes a tub 140 configured with a washing space 142 therein and a sump 210 provided at a bottom portion of the tub 140 to temporarily accommodate washing water.

The dishwasher body 100 includes a cabinet 120 disposed outside the tub 140. The cabinet 120 forms an appearance of the dishwasher body 100. The cabinet 120 is implemented in a substantially rectangular parallelepiped shape. A front surface of the tub 140 is open, and the door 110 opens and closes a front opening of the tub 140. The door 110 is rotatably coupled to a front side of the dishwasher body 100. The door 110, for example, is configured to open and close the front opening of the tub 140 while rotating in a vertical direction of the dishwasher body 100 around a hinge 112 provided at a lower portion thereof. The door 110 is configured to hermetically block (close) the washing space 142 of the tub 140 when closed. A gasket 114 (sealing member) for airtightness is provided in a mutual contact region between the door 110 and the dishwasher body 100.

The inside of the tub 140 is provided with a rack 160 to accommodate dishes. A plurality of the racks 160 may be provided therein. The rack 160 may include, for example, an upper rack 162 provided at an upper portion of the washing space 142, and a lower rack 164 provided at a lower portion of the washing space 142. On the upper side of the upper rack 162, for example, a top rack 166 may be provided.

An inside of the washing space 142 is provided with a spray arm 180 for spraying washing water. For example, the spray arm 180 may be configured to spray washing water toward the rack 160. The spray arm 180 may include, for example, an upper spray arm 182 for spraying washing water toward the upper rack 162 and a lower spray arm 184 for spraying washing water toward the lower rack 164. The spray arm 180 may include a top spray arm 186 provided above the upper spray arm 182. More specifically, the upper spray arm 182 may be provided below the upper rack 162. The lower spray arm 184 may be provided below the lower rack 164. The top spray arm 186 may be provided above the upper rack 162. For example, the top spray arm 186 may be disposed above the top rack 166.

A sump 210 is provided in a lower region of the washing space 142. The sump 210 is implemented in an upwardly open cylindrical shape. A bottom surface of the tub 140 is disposed to be inclined. An upper opening of the sump 210 is disposed in a lower region of the bottom surface of the tub 140. As a result, washing water inside the tub 140 is temporarily collected in the sump 210. A filter 220 is provided inside the sump 210. As a result, foreign substances in the washing water may be collected by the filter 220.

One side of the sump 210 is provided with a circulation pump 310 for pumping and circulating washing water. The circulation pump 310 is connected to communicate with the sump 210. The circulation pump 310 is provided with a housing 312 forming an accommodation space therein and an impeller 314 rotatably provided inside the housing 312. A heating unit for heating washing water may be provided inside the circulation pump 310, for example. The heating unit, for example, may be implemented by an electric heater 330 for generating heat when power is applied to heat washing water. The inside of the circulation pump 310 is provided with a temperature sensing unit 335 to detect the temperature of washing water.

A passage switching valve 350 for switching the passage is provided at a discharge side of the circulation pump 310. The passage switching valve 350 is provided with washing water guides 360 (washing water pipe) respectively connected to the spray arms 180. As a result, washing water discharged from the circulation pump 310 is supplied to the upper spray arm 182, the lower spray arm 184 or the top spray arm 186, respectively, by the passage switching valve 350.

Another side of the sump 210 is provided with a drain unit 410 for draining the washing water of the sump 210 to an outside of the dishwasher body 100. The drain unit 410 includes, for example, a drain passage 415 for discharging washing water and a drain pump 420 provided in the drain passage 415 to pump washing water. The drain passage 415 may be implemented by, for example, a pipe or a corrugated pipe having flexibility. The drain pump 420 is configured to include, for example, a housing 422 and an impeller 424 rotatably provided inside the housing 422.

Still another side of the sump 210 is connected to one end of a connection pipe 440, the other end of which is connected to the washing water storage unit 510 provided in the dishwasher body 100. The connection pipe 440 is provided with an open-close valve 450 that opens and closes a passage inside the connection pipe 440. The washing water storage unit 510 may be provided, for example, inside a water jacket 500 provided on one sidewall of the dishwasher body 100. In the present embodiment, it is illustrated that the washing water storage unit 510 is on a left sidewall of the dishwasher body 100, but it is merely an example, and the washing water storage unit 510 may of course be provided on a right sidewall of the dishwasher body 100 or provided in another region. More specifically, the washing water storage unit 510 may of course be provided between the left wall of the cabinet 120 and the left wall of the tub 140 in the drawing.

Figure 3:
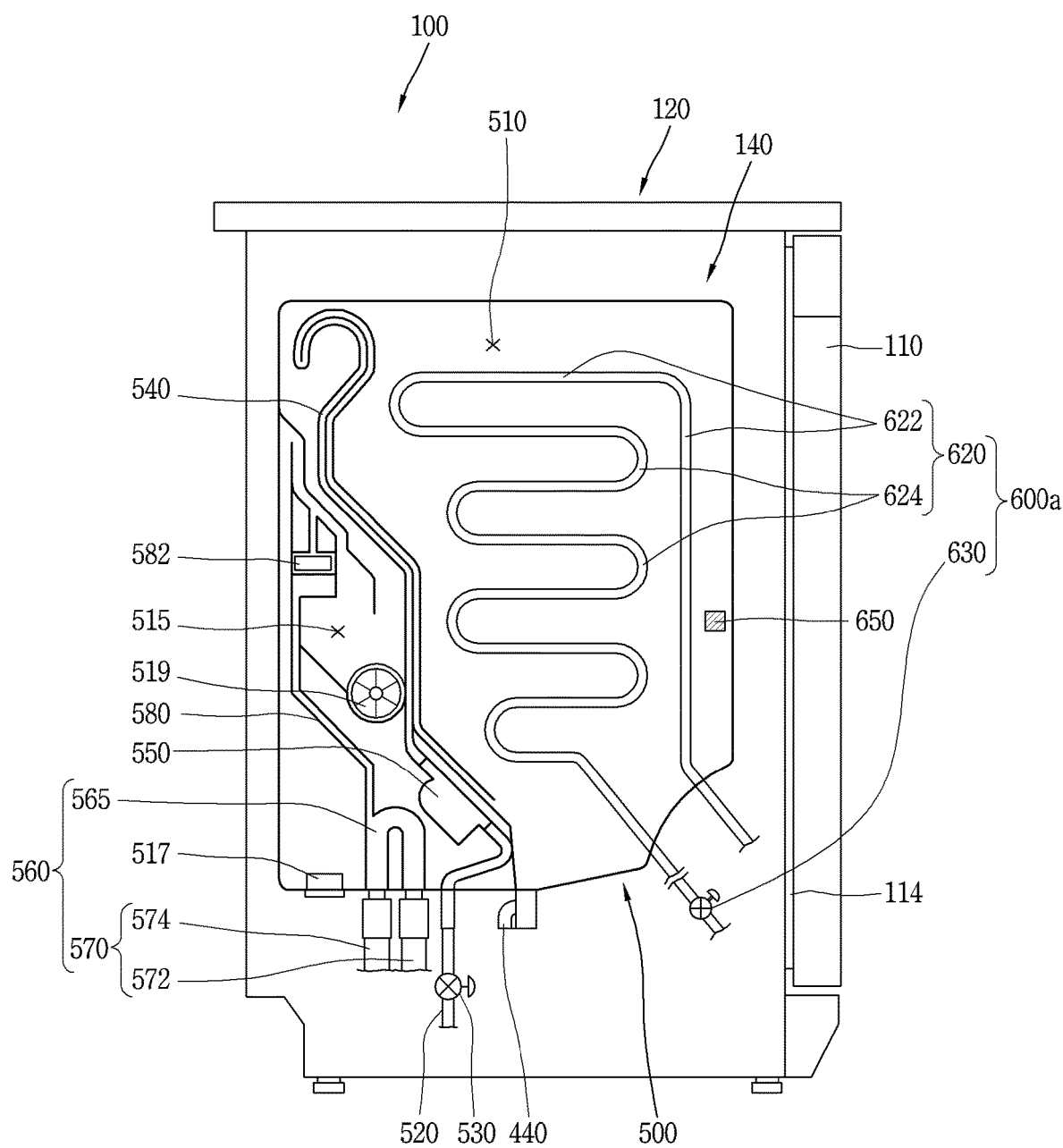
FIG. 3 is a cross-sectional view of a washing water storage unit region of the dishwasher in FIG. 1.

FIG. 3 is a cross-sectional view of a washing water storage unit region of the dishwasher in FIG. 1. As illustrated in FIG. 3, the water jacket 500 has a thickness corresponding to a space between the cabinet 120 and the tub 140, and is implemented in a plate shape having a long length in a vertical direction. One inner side of the water jacket 500 is provided with a washing water storage unit 510 for storing washing water. One side (lower in the drawing) of the water jacket 500 is provided with a water pipe 520 to supply washing water into the washing water storage unit 510. The water pipe 520 is provided with a water valve 530 to open and close the passage of the water pipe 520. The water pipe 520 is connected to an inflow passage 540 extended upward to allow washing water to flow into the washing water storage unit 510. The inflow passage 540 is implemented to extend upward along a vertical direction to partition the inner space of the water jacket 500. In other words, the inner space of the water jacket 500 is partitioned into the washing water storage unit 510 and a condensation space 515 by the inflow passage 540. The inflow passage 540 is provided with a flow meter 550 to measure a water supply amount of washing water flowing into the washing water storage unit 510.

One side of the water jacket 500 may be provided with a discharge passage 560 of washing water discharged from the drain pump 420. The drain passage 415 may include, for example, the discharge passage 560. The discharge passage 560 is located in the condensation space 515, for example. The discharge passage 560 may include, for example, a drain connection portion 565 having an inverted "U" shape. The drain pipe 570 may be connected to the drain connection portion 565. The drain pipe 570 may include, for example, a first drain pipe 572 having one end thereof connected to the drain pump 420 and a second drain pipe 574 having one end thereof extended to the outside.

The condensation space 515 is provided with a ventilation portion 517. The ventilation portion 517 is implemented to communicate with the outside. As a result, the condensation space 515 may communicate with the outside. A communication hole 519 is provided above the ventilation portion 517. The communication hole 519 communicates with an inner space (washing space 142) of the tub 140. Air introduced into the condensation space 515 through the ventilation portion 517 may flow into the tub 140 through the communication hole 519. On the contrary, air inside the tub 140 may be introduced into the condensation space 515 through the communication hole 519 and discharged to an outside of the dishwasher body 100 through the ventilation portion 517. Air introduced into the condensation space 515 from the tub 140 through the communication hole 519 may be cooled and condensed by the washing water storage unit 510 when the temperature and humidity are high.

One side of the drain connection portion 565 is configured with a condensate discharge passage 580 to discharge condensate. The condensate discharge passage 580 is connected to the discharge passage 560. As a result, condensate may be discharged to the outside through the discharge passage 560. The condensate discharge passage 580 is provided with a drain valve 582. The drain valve 582 may be implemented as a check valve that operates in one direction, for example, to prevent fluid (washing water) from moving upward and allow it to move downward. More specifically, the drain valve 582 may be configured to prevent the washing water of the drain connection portion 565 from moving upward, and to allow condensate to move downward.

On the other hand, a dishwasher provided with a heat pump of the present embodiment is configured with a heat pump 600a provided to be heat-exchangeable with the washing water of the washing water storage unit 510.

Figure 4:
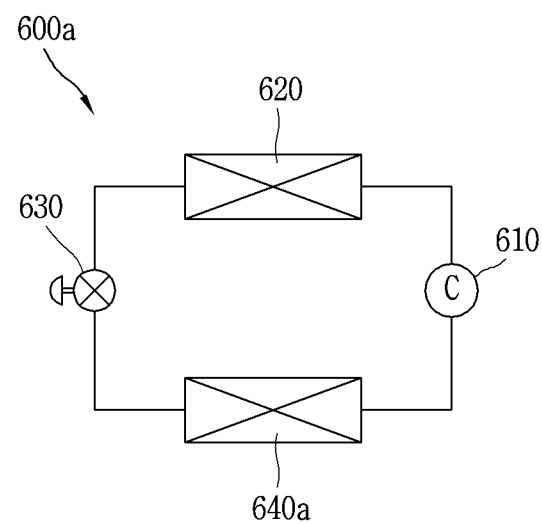
FIG. 4 is a configuration diagram of the heat pump in FIG. 1.

FIG. 4 is a partially enlarged view of FIG. 1. As illustrated in FIG. 4, a heat pump 600a includes a compressor 610 for compressing refrigerant, a condenser 620 for condensing the compressed refrigerant by heat radiation, an expansion apparatus 630 for depressurizing and expanding refrigerant, and an evaporator 640a for absorbing surrounding latent heat to evaporate.

The compressor 610 is provided, for example, inside the dishwasher body 100. More specifically, the compressor 610 is provided in a machine room 125 provided below the tub 140 inside the cabinet 120.

The condenser 620 is provided inside the washing water storage unit 510. The condenser 620 is provided inside the washing water storage unit 510 to directly exchange heat with washing water inside the washing water storage unit 510. The condenser 620 is implemented in a shape bent multiple times to increase the heat exchange area. The condenser 620 includes, for example, straight sections 622 arranged in parallel with each other and curved sections 624 connecting the straight sections 622. One side of the condenser 620 is provided with a temperature sensing unit 650 for detecting the temperature of the washing water.

The expansion apparatus 630 may be implemented by, for example, an electronic expansion valve. In the present embodiment, the expansion apparatus 630 is implemented as an electronic expansion valve, but it is merely an example, and the expansion apparatus 630 may be implemented as a capillary tube. The expansion apparatus 630 is provided between the condenser 620 and the evaporator 640a. The evaporator 640a is provided, for example, inside the dishwasher body 100.

The evaporator 640a may be disposed in the same space as the compressor 610. The compressor 610 is provided inside the machine room 125. As a result, the evaporation of refrigerant inside the evaporator 640a may be promoted. In addition, the cooling of the compressor 610 may be promoted. Although not shown in detail in the drawing, the evaporator 640a may be arranged in a shape bent multiple times on a bottom surface of the machine room 125.

Figure 5:
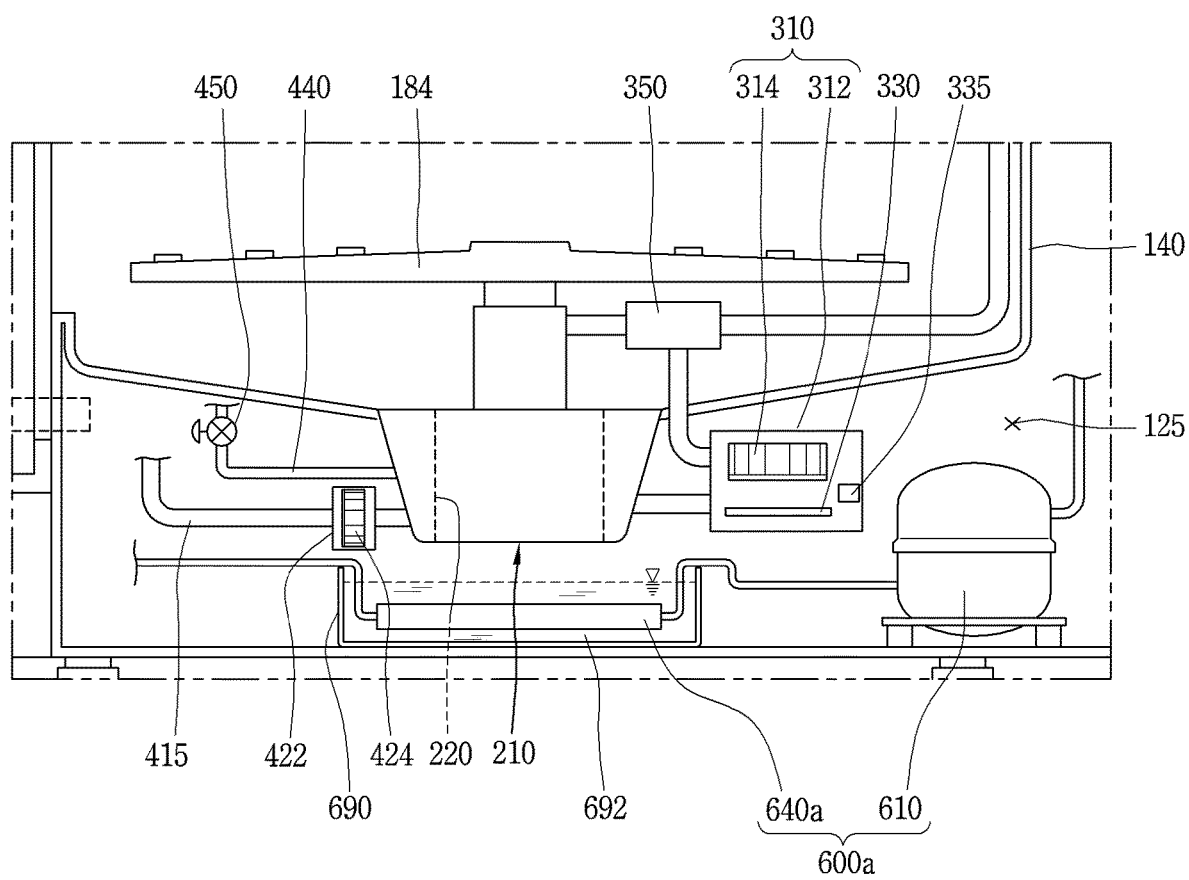
FIGS. 5 through 7 are modified examples of an evaporator in FIG. 2.
Figure 6:
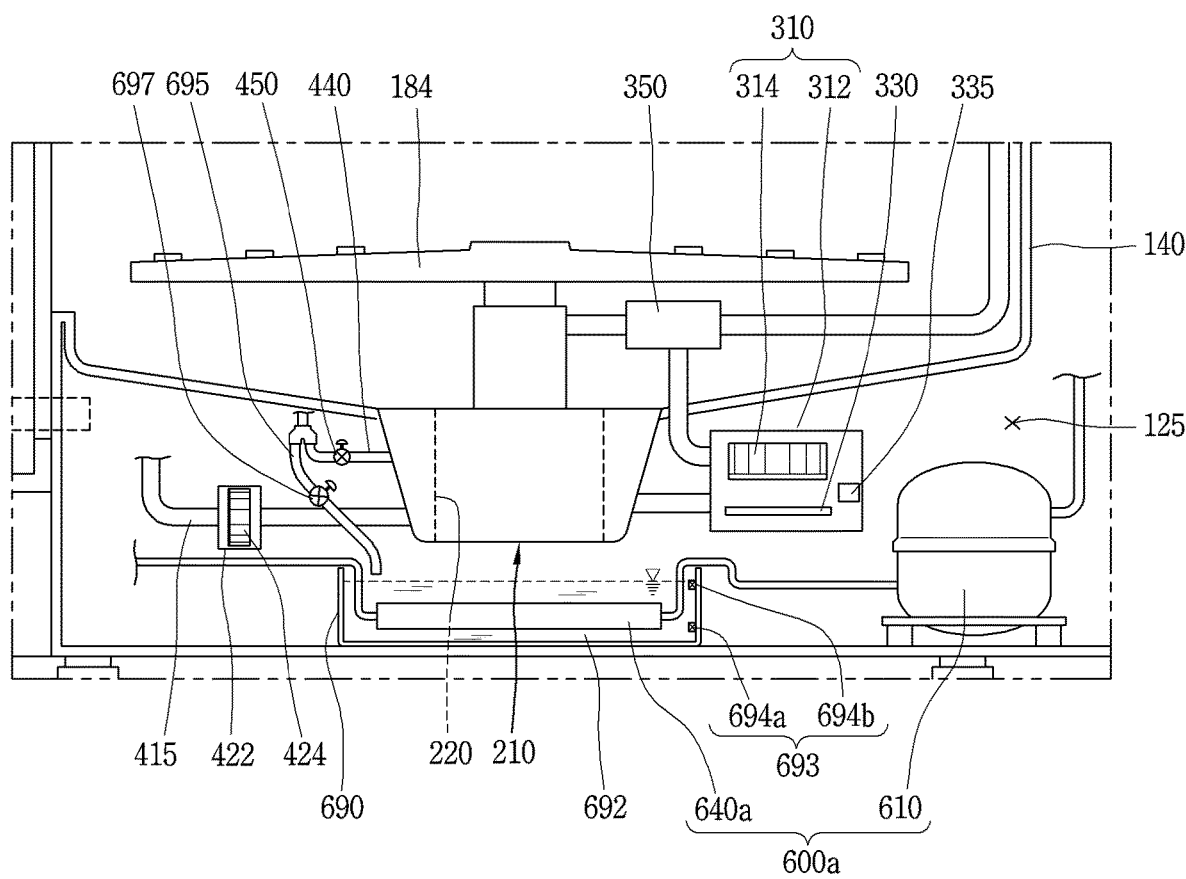
Figure 7:
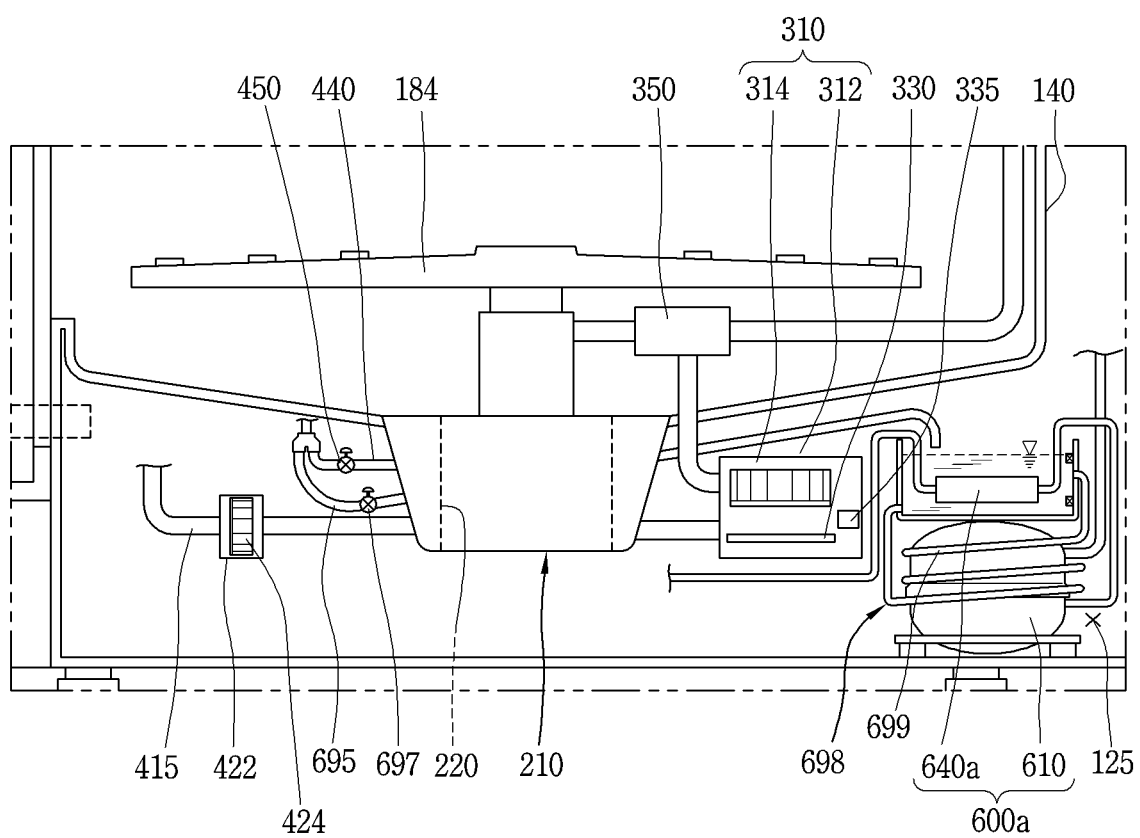

On the other hand, FIGS. 5 through 7 are modified examples of an evaporator in FIG. 2. As illustrated in FIG. 5, the evaporator 640a may be configured to exchange heat with water. A water tank 690 may be provided inside the machine room 125. The water tank 690 may be provided, for example, under the sump 210.

The water tank 690 may be implemented, for example, in an upwardly open cylindrical shape. Water 692 is provided inside the water tank 690. The evaporator 640a is accommodated in the water tank 690 so as to exchange heat with the water 692. According to such a configuration, the latent heat absorption of the evaporator 640a may be facilitated during the operation of the heat pump 600a.

As illustrated in FIG. 6, the water tank 690 may be provided with a water level sensing unit 693 for sensing a level of the water 692. The water level sensing unit 693 may include, for example, a lower sensing unit 694a and an upper sensing unit 694b spaced apart from each other in a vertical direction of the water tank 690. The water tank 690 may be provided with a water pipe 695 for supplying water into the water tank 690. The water pipe 695 may be branched from, for example, the connection pipe 440. The water pipe 695 may be provided with a water pipe valve 697 that opens and closes an internal passage. According to such a configuration, water supply inside the water tank 690 may be controlled based on the water level sensing result of the water level sensing unit 693. More specifically, when a low water level is sensed by the lower sensing unit 694a, the water pipe valve 697 may be opened to supply water to the water tank 690. When a high water level is sensed by the upper sensing unit 694b, the water pipe valve 697 may be blocked to stop water supply to the water tank 690.

As illustrated in FIG. 7, the water tank 690 may be configured to exchange heat with the compressor 610. The water tank 690 may be disposed, for example, above the compressor 610. As a result, the temperature of the water tank 690 (water) may be increased by heat energy released from the compressor 610. The water tank 690 may be provided with a heat transfer member 698 for transferring the heat energy of the compressor 610. The heat transfer member 698 may be configured to exchange heat with the compressor 610 on one side thereof and heat exchange with the water tank 690 on the other side thereof.

The heat transfer member 698 may be implemented by, for example, a heat transfer pipe through which water is circulated. The heat transfer member 698 may be formed of a metal member (for example, copper (CU) or aluminum (Al)). One end of the heat transfer member 698 is connected to communicate with one side of the water tank 690 and the other end thereof is disposed to be heat-exchanged to an outer surface of the compressor 610, and then connected to communicate with the other side of the water tank 690. The heat transfer member 698 may include a heat exchange unit 699 configured to exchange heat on a circumferential surface of the compressor 610. Here, both ends of the heat transfer member 698 may be connected to communicate with a height difference along a vertical direction of the water tank 690. According to such a configuration, the water 692 inside the heat exchange unit 699 is heat-exchanged with the compressor 610 during the operation of the compressor 610 to increase the temperature and move upward by a convection phenomenon and flow into the water tank 690, thereby circulating and heating water inside the water tank 690.

On the other hand, the heat transfer member 698, although not specifically shown in the drawing, for example, may have a rod shape of a metal member, and one end thereof may be brought into contact with the compressor 610 to exchange heat and the other end thereof may be configured to exchange heat with the water tank 690 (water). Accordingly, heat energy on a surface of the compressor 610 having a relatively high temperature may be transmitted to the water tank 690 through the heat transfer member 698 during the operation of the compressor 610.

Figure 8:
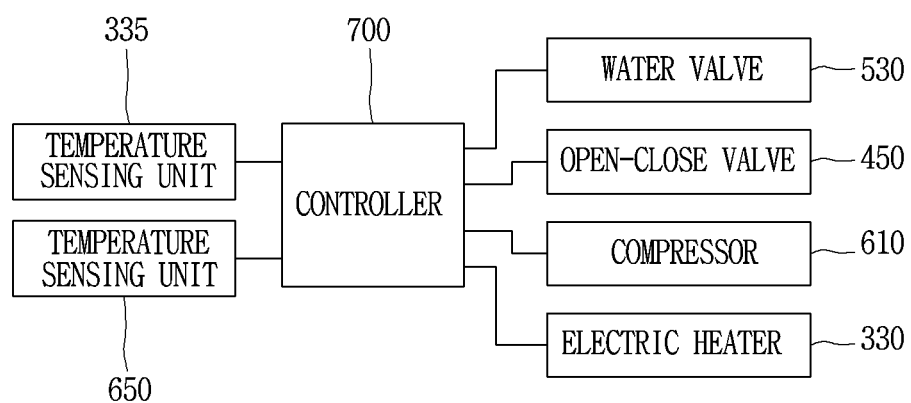
FIG. 8 is a control block diagram of the dishwasher in FIG. 1.

FIG. 8 is a control block diagram of the dishwasher in FIG. 1. As illustrated in FIG. 8, a dishwasher according to the present embodiment is configured to include a controller 700 implemented as a microprocessor provided with a control program. Temperature sensing units 335, 650 for sensing the temperature of the washing water are respectively connected to the controller 700 in a communicable manner. The compressor 610 may be controllably connected to the controller 700 so as to control the operation of the compressor 610 based on a result of sensing the temperature of the washing water. In addition, the electric heater 330 may be controllably connected to the controller 700 so as to control the temperature of the washing water based on a result of sensing the temperature of the washing water. The controller 700 is controllably connected to the water valve 530 and the open-close valve 450 so as to control washing water supplied to the sump 210.

By such a configuration, when a washing process is performed, the controller 700 opens the open-close valve 450 to supply the washing water of the washing water storage unit 510 into the sump 210. When washing water is supplied to the sump 210, the circulation pump 310 is driven, and the washing water pumped by the circulation pump 310 is supplied to the relevant spray arms 180, respectively, via the passage switching valve 350. The spray arm 180 supplied with washing water sprays the washing water onto the relevant rack 160 to wash dishes in the rack 160.

On the other hand, when a predetermined amount of washing water is supplied to the sump 210, the controller 700 blocks the open-close valve 450 and opens the water valve 530 to supply a predetermined amount of washing water to an inside of the washing water storage unit 510. The controller 700 controls the compressor 610 to drive the compressor 610 when the washing water of the washing water storage unit 510 is to be heated. Refrigerant compressed and discharged from the compressor 610 is moved to the condenser 620 to exchange heat with washing water inside the washing water storage unit 510 while passing through the condenser 620. As a result, the washing water of the washing water storage unit 510 may be heated to increase the temperature. A dishwasher having a heat pump according to the present embodiment is provided with the condenser 620 inside the washing water storage unit 510 to directly heat washing water, thereby not causing heat loss when the washing water is heated. A dishwasher having a heat pump according to the present embodiment heats the washing water of the washing water storage unit 510 during a washing process, and thus the dish washing time is not extended due to the heating of the washing water.

Refrigerant moved to the condenser 620 is condensed while exchanging heat with the washing water of the washing water storage unit 510, and depressurized and expanded while passing through the expansion apparatus 630. Refrigerant passing through the expansion apparatus 630 flows into the evaporator 640a to evaporate by absorbing surrounding latent heat. At this time, the evaporator 640a may be provided in the same space as the compressor 610 to absorb the high-temperature heat dissipation energy of the compressor 610 to promote evaporation of refrigerant. In addition, the heat dissipation of the compressor may be promoted by the latent heat (energy) absorption of the evaporator 640a to promote cooling, thereby reducing the load. Refrigerant evaporated in the evaporator 640a performs a function of heating the washing water of the washing water storage unit 510 while repeating the processes of being sucked and compressed by the compressor 610, and being condensed while exchanging heat with the washing water in the condenser 620.

When the temperature of the washing water of the washing water storage unit 510 exceeds a preset temperature as a result of sensing the temperature of the temperature sensing unit 650 of the washing water storage unit 510, the controller 700 may control the compressor 610 to stop the operation of the compressor 610.

On the other hand, when the washing process is carried out, the controller 700 may control the drain pump 420 to discharge washing water that has performed the washing process to the outside. When the drainage of the contaminated washing water of the sump 210 is completed, the controller 700 may control the open-close valve 450 to be opened to supply the washing water heated by the condenser 620 to the sump 210. When the temperature of the washing water sensed by the temperature sensing unit 335 provided in the circulation pump 310 is below a preset temperature, the controller 700 may allow power to be applied to the electric heater 330 so as to wash the washing water. When the temperature of the washing water sensed by the temperature sensing unit 335 provided in the circulation pump 310 exceeds a preset temperature, the controller 700 may stop the power supply of the electric heater 330 to stop the heating of the electric heater 330.

Figure 9:
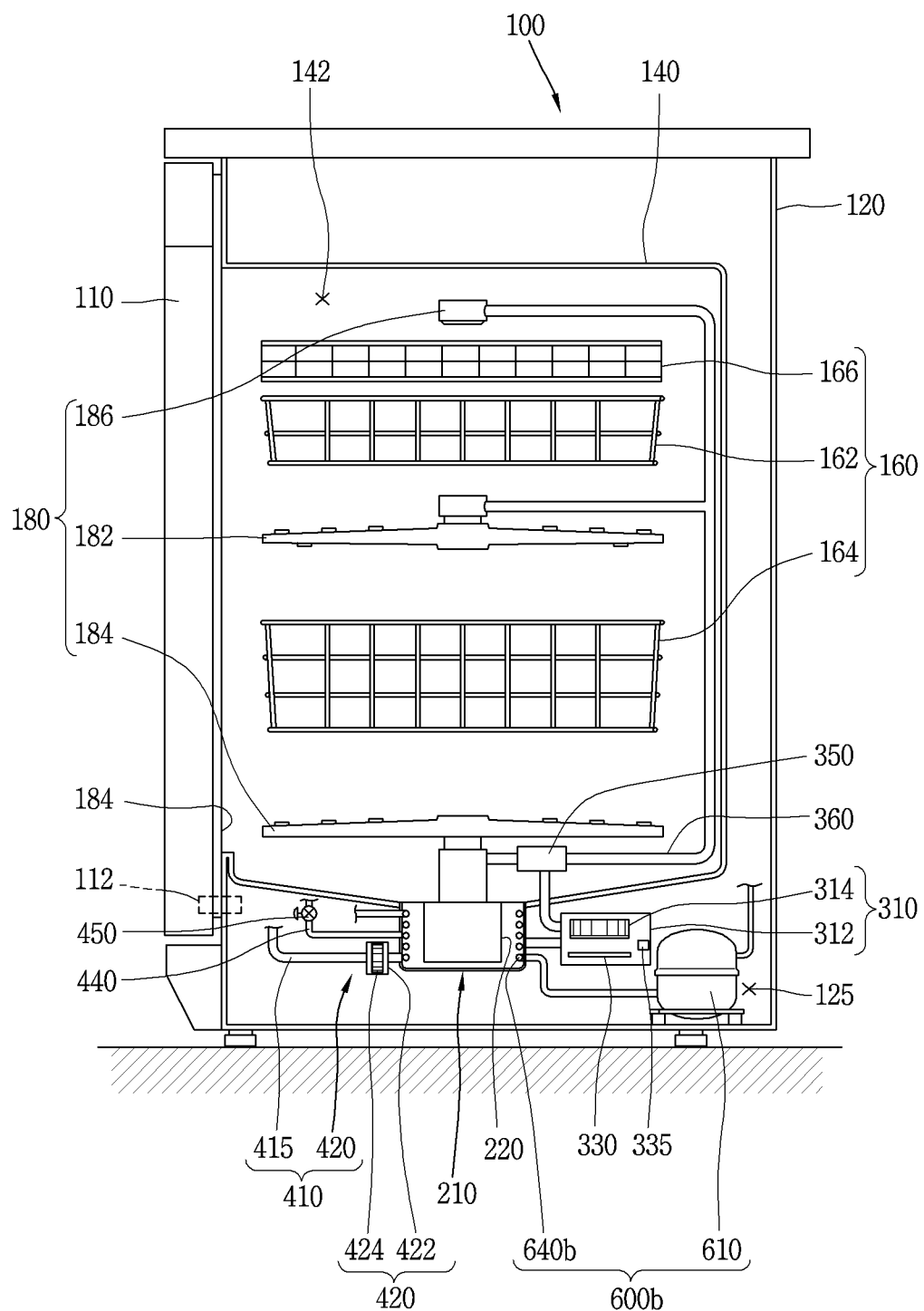
FIG. 9 is a cross-sectional view of a dishwasher having a heat pump according to another embodiment of the present disclosure.
Figure 10:
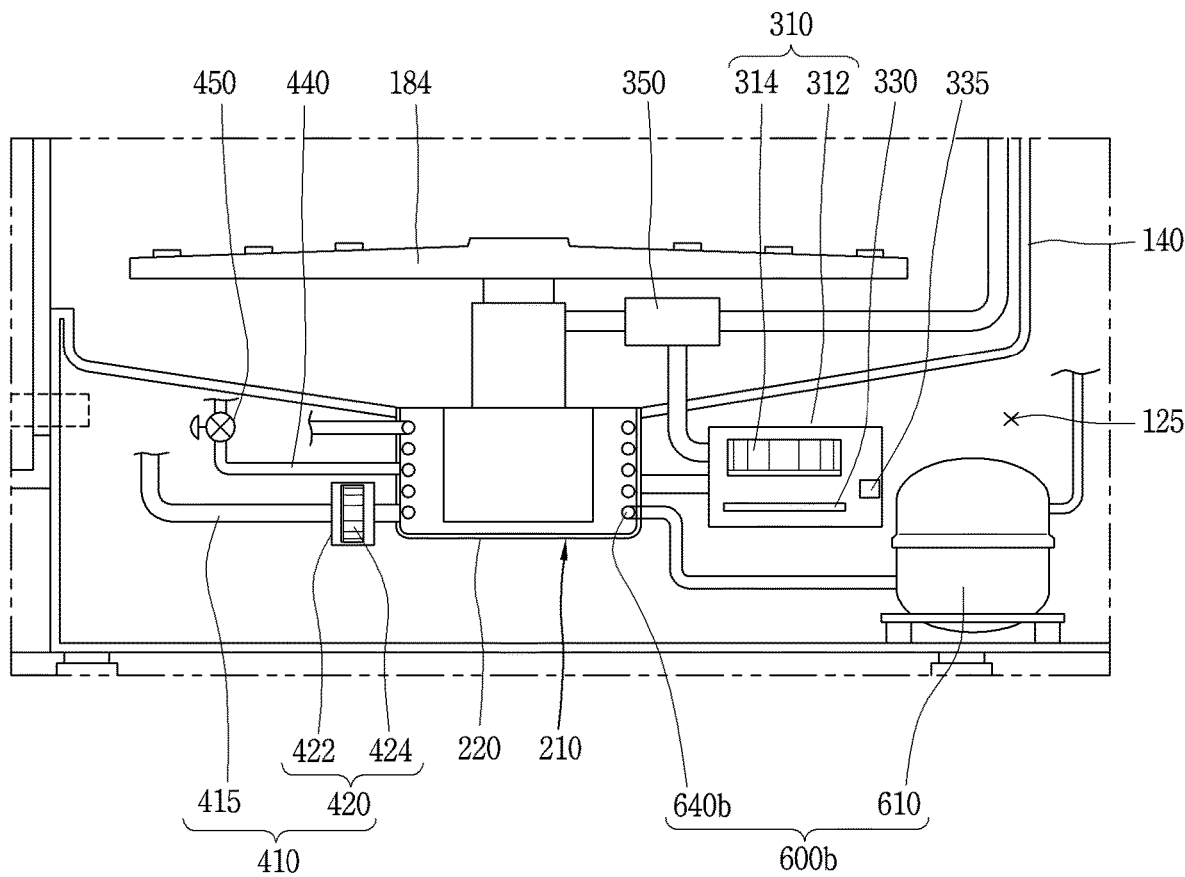
FIG. 10 is a partially enlarged view of FIG. 9.

Hereinafter, another embodiment of the present disclosure will be described with reference to FIGS. 9 and 11. FIG. 9 is a cross-sectional view of a dishwasher having a heat pump according to another embodiment of the present disclosure, and FIG. 10 is a partially enlarged view of FIG. 7. A dishwasher having a heat pump according to the present embodiment includes a dishwasher body 100 having a tub 140 configured with a washing space 142 therein and a sump 210 provided at a bottom of the tub 140 to temporarily accommodate washing water; a washing water storage unit 510 provided in the dishwasher body 100 to store washing water therein (see FIG. 3); a heat pump 600b having a compressor 610, an evaporator 640b, an expansion apparatus 630, and a condenser 620 provided to exchange heat with the wash water of the washing water storage 510; and a controller 700 for controlling the heat pump 600b to increase the temperature of the washing water of the washing water storage unit 510.

As described above, the dishwasher body 100 includes a tub 140 configured with a washing space 142 therein. The cabinet 120 is disposed outside the tub 140. The rack 160 for accommodating dishes is installed inside the tub 140. An inside of the tub 140 is provided with a spray arm 180 for spraying washing water.

The sump 210 for temporarily accommodating washing water is disposed at the bottom of the tub 140. One side of the sump 210 is provided with the circulation pump 310 for circulating washing water. A passage switching valve 350 for switching the passage is connected to a discharge side of the circulation pump 310. The other side of the sump 210 is connected to the drain pump 420 for draining the washing water of the sump 210 to the outside.

The dishwasher body 100 includes the washing water storage unit 510 for storing washing water as described above. The washing water storage unit 510 is provided inside the water jacket 500.

On the other hand, the dishwasher body 100 is provided with the heat pump 600b to heat washing water. The heat pump 600b includes a compressor 610 for compressing refrigerant, a condenser 620 for heating washing water by exchanging heat with washing water, an expansion apparatus 630, and an evaporator 640b for exchanging heat with washing water.

As described above, the condenser 620 is disposed inside the washing water storage unit 510. As a result, washing water inside the washing water storage unit 510 may be heated by exchanging heat with refrigerant inside the condenser 620.

The evaporator 640b is disposed to exchange heat with washing water inside the sump 210. The evaporator 640b may be disposed, for example, inside the sump 210. As a result, washing water inside the sump 210 and the evaporator 640b may exchange heat. The evaporator 640b may be implemented, for example, in a spiral shape. As a result, a heat exchange area between refrigerant inside the evaporator 640b and washing water inside the sump 210 may be increased. The evaporator 640b may be configured to be disposed along a vertical direction to be brought into contact with an inner surface of the sump 210. A refrigerant inlet portion of the evaporator 640b may be connected to the expansion apparatus 630, and a refrigerant outlet portion of the evaporator 640b may be connected to the compressor 610.

Figure 11:
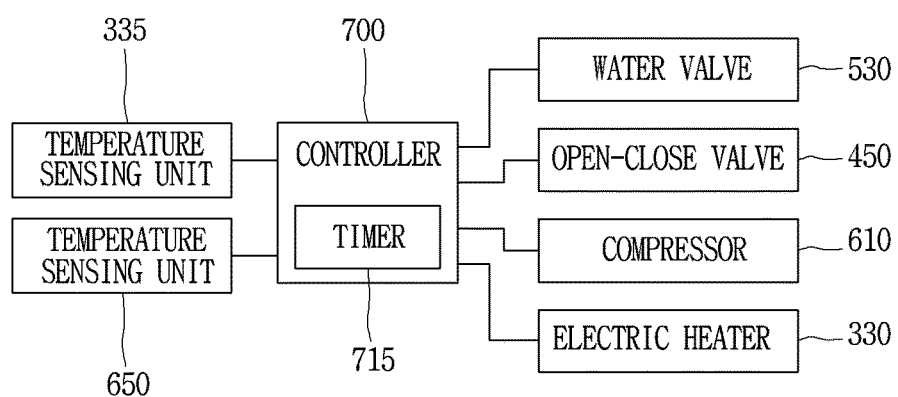
FIG. 11 is a control block diagram of the dishwasher in FIG. 9.

FIG. 11 is a control block diagram of the dishwasher in FIG. 9. As illustrated in FIG. 11, a dishwasher having the heat pump 600b according to the present embodiment is configured to include a controller 700 implemented as a microprocessor provided with a control program. Temperature sensing units 335, 650 are respectively connected to the controller 700 in a communicable manner to sense the temperature of washing water. As a result, the controller 700 senses the temperature of the washing water of the washing water storage unit 510 and the temperature of the washing water of the sump 210, respectively. The water valve 530 is controllably connected to the controller 700 so as to control washing water supplied to the dishwasher body 100. An open-close valve 450 is controllably connected to the controller 700 to control washing water supplied to the sump 210. The controller 700 is controllably connected to the compressor 610 to heat the washing water of the washing water storage unit 510. The electric heater 330 is controllably connected to the controller 700 to heat the washing water of the sump 210.

On the other hand, the controller 700 is provided with a timer 715 for counting the time to allow the washing water of the sump 210 and the evaporator 640b to exchange heat for a preset period of time.

In the present embodiment, it is illustrated a case in which heat exchange between the washing water of the sump 210 and the evaporator 640b is carried out for a preset period of time, but it is merely an example, heat exchange between the washing water of the sump 210 and the evaporator 640b may also be carried out until the temperature of the washing water is lowered to a preset temperature.

By such a configuration, when a washing process is performed, the controller 700 opens the open-close valve 450 to supply the washing water of the washing water storage unit 510 into the sump 210. The washing water is supplied to the sump 210, and when the circulation pump 310 is driven, the washing water of the sump 210 is supplied to the relevant spray arms 180, respectively, via the passage switching valve 350. Each spray arm 180 sprays washing water to the rack 160 to wash dishes in the relevant rack 160.

On the other hand, when a predetermined amount of washing water is supplied to the sump 210, the controller 700 blocks the open-close valve 450 and opens the water valve 530 to supply a predetermined amount of washing water to an inside of the washing water storage unit 510. The controller 700 controls the compressor 610 to drive the compressor 610 when the washing water of the washing water storage unit 510 is to be heated. Refrigerant compressed and discharged from the compressor 610 is moved to the condenser 620 to exchange heat with washing water inside the washing water storage unit 510 while passing through the condenser 620. As a result, the washing water of the washing water storage unit 510 may be heated to increase the temperature. A dishwasher having the heat pump 600b according to the present embodiment may be provided with a condenser 620 inside the washing water storage unit 510 to heat washing water in direct contact therewith, thereby suppressing heat loss from being generated while heating the washing water. A dishwasher having the heat pump 600b according to the present embodiment heats the washing water of the washing water storage unit 510 during a washing process, and thus the dish washing time is not extended due to the heating of the washing water.

Refrigerant moved to the condenser 620 is condensed while exchanging heat with the washing water of the washing water storage unit 510, and depressurized and expanded while passing through the expansion apparatus 630. Refrigerant passing through the expansion apparatus 630 flows into the evaporator 640b to evaporate by absorbing surrounding latent heat. At this time, the evaporator 640b absorbs latent heat from the washing water inside the sump 210 to evaporate. Here, when the temperature of the washing water is less than a preset temperature, the controller 700 may allow power to be applied to the electric heater 330 so as to maintain the temperature of the washing water above a preset temperature. Refrigerant evaporated in the evaporator 640b performs a function of heating the washing water of the washing water storage unit 510 while repeating the processes of being sucked and compressed by the compressor 610, and being moved to the condenser 620 to exchange heat.

When the temperature of the washing water of the washing water storage unit 510 exceeds a preset temperature as a result of sensing the temperature of the temperature sensing unit 650 of the washing water storage unit 510, the controller 700 may control the compressor 610 to stop the operation of the compressor 610.

When the washing process is carried out, the controller 700 may control the drain pump 420 to discharge washing water that has performed the washing process to the outside. When the drainage of the contaminated washing water of the sump 210 is completed, the controller 700 may control the open-close valve 450 to be opened to supply the washing water heated by the condenser 620 to the sump 210. When the temperature of the washing water sensed by the temperature sensing unit 335 provided in the circulation pump 310 is below a preset temperature, the controller 700 may allow power to be applied to the electric heater 330 so as to wash the washing water. When the temperature of the washing water sensed by the temperature sensing unit 335 provided in the circulation pump 310 exceeds a preset temperature, the controller 700 may stop the power supply of the electric heater 330 to stop the heating of the electric heater 330.

The controller 700 may control the circulation pump 310 to circulate the heated washing water to the spray arm 180 to perform a heat washing process and/or a heat rinsing process.

On the other hand, the controller 700 may perform a heat washing process and/or a heat rinsing process using the heated washing water to recover waste heat from the high-temperature washing water using the evaporator 640b prior to draining contaminated washing water to an outside of the dishwasher body 100.

The controller 700 may control the water valve 530 to be open prior to recovering the waste heat of the washing water using the evaporator 640b to supply washing water to an inside of the washing water storage unit 510.

When a predetermined amount of washing water is supplied into the washing water storage unit 510, the controller 700 may block the water valve 530 and control the compressor 610 to operate the compressor 610. At this time, the controller 700 allows the timer 715 to calculate the operation time of the compressor 610. When the compressor 610 is operated, refrigerant discharged from the compressor 610 is moved to the condenser 620, and the refrigerant moved to the condenser 620 is condensed by exchanging heat with the washing water of the washing water storage unit 510, and introduced to the evaporator 640b via the expansion apparatus 630. The refrigerant introduced into the evaporator 640b is evaporated by absorbing latent heat from the high-temperature washing water inside the sump 210. The refrigerant evaporated by absorbing latent heat from the evaporator 640b repeats the processes of being sucked and compressed by the compressor 610, and being introduced into the evaporator 640b through the condenser 620 and the expansion apparatus 630 to evaporate. As a result, heat energy recovered from the washing water of the sump 210 is heat radiated from the condenser 620 to heat the washing water of the washing water storage unit 510. When the operation time of the compressor 610 calculated from the timer 715 reaches a preset time, the controller 700 controls the operation of the compressor 610 to be stopped. When the operation of the compressor 610 is stopped, the controller 700 controls the drain pump 420 to drain the cooled washing water inside the sump 210 to an outside of the dishwasher.

As described above, preferred embodiments of the present disclosure are illustrated and described herein with reference to the accompanying drawings. However, the present disclosure may be implemented in various embodiments without departing from the concept or gist of the disclosure, and thus the foregoing embodiments should not be limited to the content of the detailed description.

Furthermore, the foregoing embodiments should be broadly construed within the scope of the technical concept defined by the appended claims even though they are not specifically disclosed in the detailed description herein. Moreover, all changes and modifications within the technical scope of the claims and the equivalent scope thereof should be construed to be included in the appended claims.

What is claimed is:
1. A dishwasher comprising:
a dishwasher body comprising a tub that defines a washing space therein and a sump disposed at a bottom of the tub and configured to accommodate washing water;
a washing water storage unit disposed in the dishwasher body and configured to hold washing water to be supplied to the sump;
a connection pipe that connects the washing water storage unit to the sump;
a heat pump comprising a compressor, an evaporator, an expansion apparatus, and a condenser, the condenser being configured to exchange heat with washing water in the washing water storage unit;
a drain passage connected to the sump and configured to drain washing water in the sump to an outside of the dishwasher body; and
a controller configured to control the heat pump to thereby increase a temperature of washing water in the washing water storage unit,
wherein the evaporator is configured to exchange heat with washing water in the sump or washing water in the drain passage, and
wherein the controller is configured to operate the heat pump to exchange heat between the evaporator and washing water in the sump prior to draining washing water from the sump.

2. The dishwasher of claim 1, wherein the evaporator is disposed at an outside of the tub, and
wherein the controller is configured to operate the heat pump to thereby increase the temperature of washing water in the washing water storage unit prior to supplying washing water into the washing space.

3. The dishwasher of claim 2, wherein the dishwasher body defines a space that accommodates both of the evaporator and the compressor inside the dishwasher body.

4. The dishwasher of claim 1, wherein the evaporator is disposed inside the sump.

5. The dishwasher of claim 4, wherein the evaporator is disposed inside the sump and has a spiral shape arranged along a vertical direction.

6. The dishwasher of claim 1, further comprising:
a water pipe configured to supply washing water to the washing water storage unit; and
a water valve configured to open and close the water pipe,
wherein the controller is configured to control the water valve to supply washing water to the washing water storage unit prior to draining washing water from the sump.

7. The dishwasher of claim 6, further comprising an open-close valve configured to open and close the connection pipe,
wherein the controller is configured to, based on heating washing water in the washing water storage unit, control the open-close valve to supply washing water from the washing water storage unit to the sump.

8. The dishwasher of claim 1, further comprising a cabinet that accommodates the tub,
wherein the washing water storage unit is disposed between the cabinet and the tub, and
wherein the condenser is disposed inside the washing water storage unit.

9. The dishwasher of claim 8, wherein the condenser comprises:
a plurality of linear sections that extend in parallel to one another; and
a plurality of curved sections that connect the plurality of linear sections to one another.

10. The dishwasher of claim 8, further comprising:
a temperature sensing unit disposed inside the washing water storage unit and configured sense the temperature of washing water in the washing water storage unit,
wherein the controller is configured to stop operation of the compressor based on the sensed temperature of washing water in the washing water storage unit exceeding a preset temperature.

11. A dishwasher comprising:
a dishwasher body comprising a tub that defines a washing space therein and a sump disposed at a bottom of the tub and configured to accommodate washing water;
a washing water storage unit disposed in the dishwasher body and configured to hold washing water therein;
a heat pump comprising a compressor, an evaporator, an expansion apparatus, and a condenser, the condenser being configured to exchange heat with washing water in the washing water storage unit;
a controller configured to control the heat pump to thereby increase a temperature of washing water in the washing water storage unit; and
a water tank disposed vertically below the bottom of the tub and configured to receive water,
wherein the evaporator is disposed inside the water tank and configured to exchange heat with water in the water tank.

12. The dishwasher of claim 11, wherein the water tank is disposed at an upper side of the compressor.

13. The dishwasher of claim 12, further comprising:
a heat transfer member disposed between the water tank and the compressor and configured to transfer heat energy of the compressor to the water tank.

14. The dishwasher of claim 13, wherein the heat transfer member comprises a heat exchange unit disposed on a circumference of the compressor and configured to exchange heat with the compressor.

15. The dishwasher of claim 14, wherein the heat transfer member defines a passage configured to guide washing water therein, the passage having end portions that are each coupled to the water tank and configured to communicate with the water tank.

16. The dishwasher of claim 15, further comprising:
a water pipe configured to supply water into the water tank;
a water pipe valve configured to open and close the water pipe, and
a water level sensing unit disposed in the water tank and configured to sense a water level inside the water tank,
wherein the controller is configured to open or close the water pipe valve based on a sensing result of the water level sensing unit.

17. A dishwasher comprising:
a dishwasher body comprising a tub that defines a washing space therein and a sump disposed at a bottom of the tub and configured to accommodate washing water;
a washing water storage unit disposed in the dishwasher body and configured to hold washing water therein;
a heat pump comprising a compressor, an evaporator, an expansion apparatus, and a condenser, the condenser being configured to exchange heat with washing water in the washing water storage unit;
a controller configured to control the heat pump to thereby increase a temperature of washing water in the washing water storage unit;
a heating unit configured to heat washing water to be supplied to the tub; and
a temperature sensing unit configured to sense a temperature of washing water in the tub,
wherein the controller is configured to control the heating unit to heat washing water to be supplied to the tub based on the sensed temperature of washing water in the tub being less than a preset temperature.

18. The dishwasher of claim 17, further comprising:
a circulation pump configured to circulate washing water in the sump to the tub,
wherein the heating unit comprises an electric heater configured to generate heat based on power applied to the electric heater, and
wherein both of the electric heater and the temperature sensing unit are disposed inside the circulation pump.

* * * * *